United States Patent [19]

Kobashi et al.

[11] Patent Number: 4,929,685

[45] Date of Patent: May 29, 1990

[54] METHOD FOR MODIFYING THE SURFACE OF POLYCARBONATE RESIN

[75] Inventors: Rikizo Kobashi; Shigeyuki Takase; Hiroyuki Enomoto; Yasushi Hayasaki, all of Nishinomiya; Toyohisa Kobayashi, Kawasaki; Shingo Yamazaki, Nishinomiya, all of Japan

[73] Assignees: Nippon Oil and Fats Co., Ltd., Japan; PPG Industries, Inc., Pa.

[21] Appl. No.: 217,408

[22] Filed: Jul. 11, 1988

[30] Foreign Application Priority Data

Jun. 7, 1986 [JP] Japan .................................. 61-132388
Jul. 15, 1987 [JP] Japan .................................. 62-174777

[51] Int. Cl.$^5$ ............................................. C08F 263/00
[52] U.S. Cl. ........................... 525/277; 525/327.3; 525/375; 525/378; 525/379; 525/380
[58] Field of Search ................. 525/277, 327.3, 375, 525/378, 379, 380

[56] References Cited

U.S. PATENT DOCUMENTS 2,370,565  2/1945  Muskat et al. ........................ 260/78
3,518,040  6/1970  Caldwell et al. ..................... 8/115.5
4,091,048  5/1978  Labana et al. ....................... 525/186

*Primary Examiner*—Theodore E. Pertilla
*Attorney, Agent, or Firm*—Arnold, White & Durkee

[57] ABSTRACT

A polycarbonate resin of a copolymer of diethyleneglycol bis(allyl carbonate) with one of glycidyl acrylate and glycidyl methacrylate, its homopolymer and its copolymer, and further occasionally a copolymerizable compound can be easily modified with active amine at its surface, and the surface-modified copolymer of diethylene glycol bis(allyl carbonate) with glycidyl acrylate or methacrylate can be easily dyed with acid dye in a sharp color tone and can be used in an optical instrument demanded to have a high vividness of color.

4 Claims, No Drawings

METHOD FOR MODIFYING THE SURFACE OF POLYCARBONATE RESIN

BACKGROUND OF THE INVENTION (1) Field of the Invention:

The present invention relates to a method for modifying the surface of polycarbonate resin, particularly, the surface of diethylene glycol bis(allyl carbonate) copolymer resin.

(2) Related Art Statement:

Diethylene glycol bis(allyl carbonate) copolymer resin (hereinafter referred to as ADC resin) is a transparent thermosetting resin having excellent optical properties and mechanical properties, and is used as a lens for glasses and the like (Kogyo Zairyo, Vol. 25, No. 3, pages 35–37 (1977), and U.S. Pat. No. 2,370,565). ADC resin is different from polymethacrylate resin and can be easily dyed in the optician shop (Kindai Megane, 1977, May, pages 118–129).

However, the dye capable of being used effectively in the dyeing in the optician shop is limited to a dispersant dye, and moreover the dispersant dye solution must be used at a high temperature of at least 90° C.

ADC resin has not hitherto been able to be dyed with an acid dye. When ADC resin is dyed with a commonly used dispersant dye, the dyed ADC resin absorbs not only a light having a specific wavelength, but also light having wavelengths in the vicinity of the specific wavelength. Therefore, the ADC resin dyed with a dispersant dye has a broad transmittance curve. Such dyed resin can not satisfactory be used in an industrial instrument requiring a high vividness of color. Particularly, liquid crystal is recently used in the OA instrument and indicator, and hence the colored sheet or dyed sheet to be used in these instruments is demanded to have a sharp transmittance curve.

The inventors have made various investigations and experiments, and found out that an ADC resin having excellent dyeability and being able to be dyed with acid dye can be obtained by modifying the surface of the ADC resin, and accomplished the present invention.

SUMMARY OF THE INVENTION

The present invention provides a method for modifying the surface of an ADC resin so as to be dyed with acid dye. In general, the dyeing with acid dye results in a dyed product having a sharp transmittance curve more easily than dyeing with dispersant dye. That is, the present invention gives a dyeability to an ADC resin so as to be dyed with acid dye and to easily obtain a dyed product having excellent optical properties.

One of the features of the present invention lies in a method for modifying the surface of a polycarbonate resin, comprising modifying the surface of a polycarbonate resin consisting of a copolymer of 99–50% by weight of component (A) and 1–50% by weight of component (B) with an amine having an active hydrogen atom, said component (A) being diethyleneglycol bis(allyl carbonate), and said component (B) being one member of monomers of glycidyl acrylate or glycidyl methacrylate, homopolymers thereof and copolymers thereof with a monomer copolymerizable therewith.

Another feature of the present invention lies in a method for modifying the surface of a polycarbonate resin, comprising modifying the surface of a polycarbonate resin consisting of a copolymer of 99–50% by weight of component (A), 1–50% by weight of component (B), and 0–49% by weight of at least one of components (C) and (D) with an amine having an active hydrogen atom, said component (A) being diethylene glycol bis(allyl carbonate), said component (B) being one member of monomers of glycidyl acrylate or glycidyl methacrylate, homopolymers thereof and copolymers thereof with a monomer copolymerizable therewith, said component (C) being an active vinyl monomer copolymerizable with component (A) or (B), and said component (D) being a polymer which can be dissolved or dispersed in component (A), (B) or (C).

DESCRIPTION OF THE PREFERRED EMBODIMENT

As component (A) to be used in the present invention, there can be used commercially available ordinary diethylene glycol bis(allyl carbonate). Component (A) is used in an amount of 99–50% by weight based on the total amount of the mixture of components (A) and (B), or components (A), (B) and at least one of (C) and (D). When the amount of component (A) is less than 50% by weight, the resulting copolymer is poor in the characteristic properties, such as transparency, optical properties, impact resistance, solvent resistance, heat resistance, dyeability and the like, inherent to the compound of component (A), and even when the amount of component (A) is more than 99%, the resulting copolymer has not remarkably improved dyeability.

As component (B), there can be used monomers of glycidyl acrylate or glycidyl methacrylate, homopolymers of glycidyl acrylate or glycidyl methacrylate, and copolymers of glycidyl acrylate or glycidyl methacrylate with a monomer copolymerizable therewith, in which copolymer the amount of glycidyl acrylate monomer units or glycidyl methacrylate monomer units is at least 2% by weight. As the monomer to be used together with glycidyl acrylate or glycidyl methacrylate in component (B), there can be used linear alkyl(C: 1~22) (meth)acrylates, (hereinafter, the term "(meth)acrylate" means acrylate or methacrylate), such as methyl (meth)acrylate, ethyl (meth)acrylate, propyl (meth)acrylate, butyl (meth)acrylate, lauryl (meth)acrylate and the like; branched alkyl(C: 3~18) (meth)acrylates, such as 2-ethylhexyl (meth)acrylate, isostearyl (meth)acrylate and the like; cyclic alkyl(C: 3~10) (meth)acrylates, such as cyclohexyl (meth)acrylate and the like; hydroxyalkyl(C: 2~10) (meth)acrylates, such as hydroxyethyl (meth)acrylate, hydroxypropyl (meth)acrylate, hydroxybutyl (meth)acrylate and the like; mono- or di-(meth)acrylates of a polyalkylene glycol, such as diethylene glycol, dipropylene glycol, triethylene glycol, tripropylene glycol, polyethylene glycol, polypropylene glycol or the like, which is a condensation product of 2–100 mols of alkylene glycols having 2–4 carbon atoms; and vinyl monomers, such as vinyl toluene, vinyl acetate, vinyl propionate, acrylonitrile, methacrylonitrile, vinyl chloride, ethylene, propylene, butadiene, acrylamide, methacrylamide, vinylpyrolidone and the like.

The molecular weight of the homopolymer or copolymer to be used as component (B) is not particularly limited, but the homopolymers or copolymers having a weight average molecular weight of about 1,000–1,000,000 are generally used.

Component (B) is used in an amount of 1–50% by weight, preferably 5–30% by weight, based on the total amount of the mixture of components (A) and (B), or components (A), (B) and at least one of (C) and (D) under a condition that the resulting polycarbonate resin contains 1–50% by weight, preferably 5–30% by weight, of glycidyl acrylate or glycidyl methacrylate monomer units. When the amount of component (B) is more than 50% by weight, the resulting polycarbonate resin is poor in the physical properties. Moreover, a polycarbonate resin having a content of glycidyl acrylate or glycidyl methacrylate monomer units lower than 1% by weight is very poor in the dyeability, and a polycarbonate resin having a content of glycidyl acrylate or methacrylate monomer units higher than 50% by weight is poor in the mold releasing property, optical property, solvent resistance and the like. Therefore, a polycarbonate resin having a content of glycidyl acrylate or methacrylate monomer units lower than 1% by weight or higher than 50% by weight is not preferably used in the present invention.

As component (C), there can be used (meth)acrylates of alkyl alcohols or aryl alcohols, for example, linear alkyl(C: 1~22) (meth)acrylates, such as methyl (meth)acrylate, ethyl (meth)acrylate, propyl (meth)acrylate, butyl (meth)acrylate, lauryl (meth)acrylate, stearyl (meth)acrylate and the like; branched alkyl(C: 3~18) (meth)acrylates, such as 2-ethylhexyl (meth)acrylate, isostearyl (meth)acrylate and the like; cyclic alkyl(C: 3~10) (meth)acrylates, such as cyclohexyl (meth)acrylate and the like; hydroxyalkyl(C: 2~10) (meth)acrylates, such as hydroxyethyl (meth)acrylate, hydroxybutyl (meth)acrylate and the like; mono- or di-(meth)acrylates of a polyalkylene glycol, such as diethylene glycol, dipropylene glycol, triethylene glycol, tripropylene glycol, polyethylene glycol, polypropylene glycol or the like, which is a condensation product of 2–100 mols of alkylene glycols having 2–4 carbon atoms; and active vinyl monomers, such as styrene, vinyltoluene, vinyl acetate, acrylonitrile, methacrylonitrile, acrylamide, methacrylamide, vinylpyrolidone and the like.

Further, as component (C), there can be used polyfunctional monomers, such as di-(meth)acrylate of polyoxyalkylene bisphenol A, (meth)acrylate of trimethylolpropane, (meth)acrylate of pentaerythritol or dipentaerythritol, and the like.

As component (D), there can be used homopolymers or copolymers of the monomers used in the above described component (C), and further commercially available polymers, such as polyvinyl chloride, polyvinyl alcohol, polyvinyl acetate, polycarbonate, polyethylene, polypropylene, polybutadiene and the like, which can be dissolved or dispersed in the diethyleneglycol bis(allyl carbonate) monomer of component (A), in the compounds of component (B) or in the copolymeriable vinyl monomer of component (C). Component (D) may be used by directly dissolving or dispersing in components (A), (B) and/or (C) or may be used by previously dissolving in other solvent, adding the resulting solution of component (D) to components (A), (B) and/or (C), and then distilling off the solvent.

Components (C) and (D) are used alone or in admixture in a total amount of components (C) and/or (D) of 0–49% by weight, preferably 0–20% by weight, based on the total amount of the mixture of components (A), (B) and at least one of (C) and (D) in view of the characteristic properties of the resulting ADC resin.

In the production of the ADC resin according to the present invention, given amounts of components (A) and (B), or components (A), (B) and at least one of (C) and (D) are mixed depending upon the use purpose of the resulting ADC resin, and the resulting mixture is heated and polymerized. As the polymerization catalyst, there are used diisopropyl peroxydicarbonate, benzoyl peroxide, dicumyl peroxide, 1,1-bis(t-butylperoxy)-3,3,5-trimethylcyclohexene and other polymerization catalysts. These polymerization catalysts are used in an amount of 1–5% by weight based on the total amount of the mixture of components (A) and (B), or components (A), (B) and at least one of (C) and (D). The polymerization temperature is varied depending upon the decomposition temperature of the polymerization catalyst, but is generally within the range of from room temperature to about 130° C. The polymerization time is varied depending upon the shape, thickness, dimension and the like of the resulting ADC resin, but is generally within the range of about 2–24 hours. In the conventional methods, unless a multistage heating pattern is used with respect to the polymerization temperature and time, the reaction mass shrinks during the polymerization reaction to form cracks in the resulting ADC resin, and hence the yield of the resin is decreased and an ADC resin having a smooth surface is not obtained. However, according to the present invention, when a homopolymer or copolymer is used as component (B) or a polymer of component (D) is used in the starting component mixture, the polymerization temperature and time can be relatively easily selected so as to obtain an ADC resin in a high yield. Moreover, an ADC resin having a flat sheet shape, rod shape, cylindrical shape having a semi-circular cross-section, concave or convex lens shape or the like can be obtained by selecting properly the mold, into which the ADC resin is poured.

The surface of the resulting ADC resin is modified by using an amine having an active hydrogen atom The amines having an active hydrogen atom include amines having the following general formulae (I) and (II):

(I)

wherein $R_1$ and $R_2$ may be same or different, and represent hydrogen atoms, linear or branched alkyl groups having 1–8 carbon atoms, alkanol groups having 1–8 carbon atoms, residues of alicyclic or aromatic compound having 3–8 carbon atoms, and residues of a compound having 2–10 atoms in the total number of carbon and nitrogen atoms, and

(II)

where $R_3$ represents a residue of a compound having 2–10 atoms in the total number of carbon and nitrogen atoms.

These amines include ammonia, linear alkylamines, such as monomethylamine, dimethylamine, monoethylamine, diethylamine, monopropylamine, dipropylamine, monobutylamine, dibutylamine, monohexylamine, dihexylamine, monooctylamine, dioctylamine and the like; branched alkylamines, such as monoisopropylamine, diisopropylamine, mono-2-ethylhexylamine, di-2-ethylhexylamine and the like; alkanolamines, such as monoethanolamine, diethanolamine and the like; cyclohexylamine, aniline, ethylenediamine, hexamethylenediamine, triethylenetetramine, phenylenediamine, piperazine, peperidine, pyrrole, imidazole and the like.

The modification of the surface of ADC resin by an amine having an active hydrogen atom is carried out by a process, wherein the ADC resin is immersed in the amine itself or in a solution of the amine, and treated therein at a temperature of 50°-100° C. for 1-180 minutes to react the glycidyl group present in the resin surface with the amine.

The amine can be used in the form of a solution of the amine in water or in a solvent depending upon the property of the amine. In this case, it is preferable that the concentration of amine in the solution is at least 25% by weight. As the solvent, there can be used hydrocarbons, such as cyclohexane, benzene, toluene and the like; alcohols, such as ethanol, n-propanol, n-butanol, n-hexanol, cyclohexanol, octanol and the like; ketones, such as methyl ethyl ketone, methyl butyl ketone and the like; polyhydric alcohols and their derivatives, such as ethylene glycol, diethylene glycol, ethylene glycol monomethyl ether, ethylene glycol monoethyl ether, ethylene glycol dimethyl ether, ethylene glycol diethyl ether, ethylene glycol monoacetate, ethylene glycol diacetate and the like; and other solvents.

The resulting surface-modified ADC resin can be easily dyed with an ordinary acid dye. For example, the surface-modified ADC resin can be easily dyed by treating the resin in a dye solution containing an acid dye and a dyeing assistant of at least one of ammonium acetate, glacial acetic acid, formic acid, sodium sulfate and a surfactant at a bath temperature of 50°-100° C. for 1-180 minutes.

The acid dyes are, for example, Kayakalan Orange RL, Kayacyl Rubinol 3GS, Kayanol Blue NR, Kayalon Navy Blue NB-E, which are sold by Nippon Kayaku Co., Ltd., and the like.

Moreover, in the present invention, a translucent or opaque ADC resin, which can be dyed in a vivid color, can be obtained by selecting properly the polymer or monomer to be copolymerized with diethylene glycol bis(allyl carbonate) depending upon the purpose.

Further, in the present invention, additives, such as antioxidant, ultraviolet ray absorbent, mold releasing agent, pigment, organic or inorganic filler and the like, can be added to the mixture of the components at the copolymerization so as to obtain an ADC resin containing these additives depending upon the purpose.

According to the present invention, active groups to react with acid dye can be derived from the reaction of the epoxides of glycidyl (meth)acrylate with the amine, and introduced into only the surface of an ADC resin without decreasing its physical properties.

The surface-modified ADC resin according to the present invention can be dyed with not only disperse dye, but also acid dye. Therefore, various kinds of dyes can be used, and a color tone can be selected from wide range, and hence the ADC resin can be used in a wide field. Moreover, since a dyed product having a sharp transmittance curve can be easily obtained, the dyed product can be satisfactorily used in industrial instruments requiring high vividness of color. Accordingly, the present invention is very valuable in industry.

The following examples are given for the purpose of illustration of this invention and are not intended as limitations thereof.

EXAMPLE 1

A mixture of 360 g of diethylene glycol bis(allyl carbonate) (trademark: CR-39, sold by PPG Industries, Inc.), 40 g of glycidyl methacrylate and 12 g of diisopropyl peroxydicarbonate was homogeneously mixed. A polyvinyl chloride gasket having a diameter of 2 mm was interposed between a pair of previously cleaned glass plates (sold by Nippon Sheet Glass Co., Ltd., 500 mm×500 mm×6 mm) and fixed between them by means of a clip to form a mold. The above obtained homogeneous mixture was poured into the mold, and polymerized for 15 hours in an incubator according to a temperature-rising schedule from room temperature (25° C.) to 100° C., wherein the mixture was kept at room temperature (25° C.) for 30 minutes, at 45°-50° C. for 7 hours, at 55°-60° C. for 3 hours, at 65°-70° C. for 2 hours, at 80°-85° C. for 2 hours, and at 95°-100° C. for 30 minutes. The cured product was then taken out of the mold, and a test piece of 50 mm square was cut out from the cured product. This test piece was treated at 70° C. for 30 minutes in a 28% aqueous ammonia solution to obtain a surface-modified product.

Into water were added 0.05 g of Kayakalan Orange RL (sold by Nippon Kayaku Co., Ltd.), 5 g of ammonium acetate and 2 g of glacial acetic acid, and the total amount of the resulting solution was made up to 100 ml. The solution was heated up to 90° C., and the above described surface-modified test piece was put into the heated solution and dyed therein for 5 minutes while being stirred. After dyeing, the dyed test piece was taken out from the solution, washed with water and then dried. When the transmittance of the above treated test piece was measured within the wavelength range of 400-700 mm by means of a spectrophotometer, it was found that the test piece had transmittances of 4% at 400 nm, 3% at 490 nm, 5% at 500 nm, 35% at 550 nm, 83% at 580 nm and 88% at 600 nm. Therefore, it was ascertained that the test piece had been satisfactorily dyed.

EXAMPLES 2-25

Polymerizations, amine treatments and dyeings were carried out in the same manners as described in Example 1. The raw materials, treating conditions and obtained results are shown in Table 1 together with those of Example 1.

The symbols indicating the components of copolymer in Table 1 are as follows.

CR-39: diethylene glycol bis(ally carbonate) (sold by PPG Industries Inc., trademark)
GMA: glycidyl methacrylate
GA: glycidyl acrylate
VA: vinyl acetate
MMA: methyl methacrylate
PP-1000: poly(n=7)propylene glycol monomethacrylate
PE-350: poly(n=8~9)ethylene glycol monomethacrylate
ADP-200: poly(n=3~4)propylene glycol diacrylate
ADA-200: diacrylate of an addition product of 4 mol of ethylene oxide to bisphenol A
i-BOMA: isobutyl methacrylate C$_{12}$OMA: dodecyl methacrylate When Kayacyl Rubinol 3GS or Kayanol Blue NR (both being sold by Nippon Kayaku Co., Ltd.) is used as an acid dye, the following dyeing assistants are used.

Kayacyl Rubinol 3GS
   sodium sulfate 10 hydrate (Glauber's salt) 2%
   formic acid 5%

Kayanol Blue NR
   sodium sulfate 10 hydrate (Glauber's salt) 2%
   glacial acetic acid 3%

COMPARATIVE EXAMPLES 1 AND 2

A mixture of 400 g of diethylene glycol bis(allyl carbonate) and 12 g of diisopropyl peroxydicarbonate was polymerized in the same manner as described in Example 1.

Two test pieces were prepared from the resulting polymer without carrying out an amine treatment. One of the test pieces was dyed with 0.05 g of a disperse dye of Kayalon Navy Blue NB-E (sold by Nippon Kayaku K.K.), which was dispersed in 100 ml of water together with 0.015 g of acetic acid, 0.069 g of sodium acetate and 0.1 g of Diapon T (trademark of sodium N-tallow fatty acid-N-methyl taurate sold by Nippon Oil & Fats Co., Ltd.), at 90° C. for 30 minutes in the same manner as described in Example 1. The other test piece was dyed with an acid dye of Kayanol Blue NR in the same manner as described in Example 1.

The transmittance of the dyed test pieces was measured by means of a spectrophotometer. As the result, it was found that the test piece was dyed with the disperse dye, but the test piece was not dyed with the acid dye.

COMPARATIVE EXAMPLE 3

A polymerization was carried out and a test piece was produced in the same manners as described in Example 1. When the test piece was dyed with an acid dye without carrying out an amine treatment, the test piece was not substantially dyed.

COMPARATIVE EXAMPLE 4

A mixture of 40 g of glycidyl methacrylate and 360 g of methyl methacrylate was polymerized and a test piece was produced in the same manners as described in Example 1. When the test piece was treated in monoethanolamine at 90° C. for 30 minutes, the surface of the test piece was erroded with the amine to be formed into an uneven surface, and hence the test piece was no longer suitable to be used in the optical purpose.

The obtained results in the above Comparative examples 1, 2, 3 and 4 are also shown in Table 1.

TABLE 1

| | | Component | | | Amine treatment condition | | | |
|---|---|---|---|---|---|---|---|---|
| | | (A), (wt %) | (B), (wt %) | (C), (wt %) | Amine | Concentration (%) | Temperature (°C.) | Time (min.) |
| Example | 1 | CR-39, 90 | GMA, 10 | — | ammonia | 28 | 70 | 30 |
| | 2 | CR-39, 97.5 | GMA, 2.5 | — | " | 28 | 70 | 30 |
| | 3 | CR-39, 70 | GMA, 30 | — | " | 28 | 70 | 30 |
| | 4 | CR-39, 50 | GMA, 50 | — | " | 28 | 70 | 30 |
| | 5 | CR-39, 90 | GMA, 10 | — | monobutylamine | 100 | 90 | 10 |
| | 6 | CR-39, 90 | GMA, 10 | — | monooctylamine | 50 | 80 | 10 |
| | 7 | CR-39, 90 | GMA, 10 | — | cyclohexylamine | 100 | 90 | 10 |
| | 8 | CR-39, 90 | GMA, 10 | — | aniline | 100 | 90 | 10 |
| | 9 | CR-39, 90 | GMA, 10 | — | ethylenediamine | 50 | 80 | 10 |
| | 10 | CR-39, 90 | GMA, 10 | — | hexamethylenediamine | 50 | 80 | 10 |
| | 11 | CR-39, 90 | GMA, 10 | — | monoethanolamine | 100 | 90 | 10 |
| | 12 | CR-39, 90 | GMA, 10 | — | dibutylamine | 50 | 80 | 10 |
| | 13 | CR-39, 80 | GMA, 10 | MMA, 10 | monoethanolamine | 100 | 60 | 60 |
| | 14 | CR-39, 50 | GMA, 10 | MMA, 10 | " | 100 | 60 | 60 |
| | 15 | CR-39, 80 | GMA, 10 | VA, 10 | " | 100 | 60 | 120 |
| | 16 | CR-39, 80 | GMA, 10 | PP-1000, 10 | monoethanolamine | 100 | 70 | 30 |
| | 17 | CR-39, 80 | GMA, 10 | PE-350, 10 | " | 100 | 70 | 30 |
| | 18 | CR-39, 80 | GA, 10 | ADP-200, 10 | " | 100 | 70 | 30 |
| | 19 | CR-39, 80 | GA, 10 | ADA-200, 10 | " | 100 | 70 | 30 |
| | 20 | CR-39, 80 | GMA, 10 | i-BOMA, 10 | " | 100 | 70 | 30 |
| | 21 | CR-39, 80 | GMA, 10 | C$_{12}$OMA, 10 | " | 100 | 70 | 30 |
| | 22 | CR-39, 90 | GMA, 10 | — | piperazine | 50 | 70 | 30 |
| | 23 | CR-39, 90 | GMA, 10 | — | piperidine | 100 | 70 | 30 |
| | 24 | CR-39, 90 | GMA, 10 | — | pyrrole | 100 | 70 | 30 |
| | 25 | CR-39, 90 | GMA, 10 | — | imidazole | 50 | 70 | 30 |
| Comparative example | 1 | CR-39, 100 | — | — | — | — | — | — |
| | 2 | CR-39, 100 | — | — | — | — | — | — |
| | 3 | CR-39, 90 | GMA, 10 | — | — | — | — | — |
| | 4 | — | GMA, 10 | MMA, 90 | monoethanolamine | 100 | 90 | 30 |

| | | Dyeing condition | | | Transmittance | | |
|---|---|---|---|---|---|---|---|
| | | Dye | Bath temperature (°C.) | Time (min.) | Wavelength (nm) | T (%) | Remarks |
| Example | 1 | Kayakalan Orange RL | 90 | 5 | 490 | 3 | aqueous ammonia solution |
| | 2 | " | 90 | 30 | " | 12 | aqueous ammonia solution |
| | 3 | " | 90 | 5 | " | 1 | aqueous ammonia solution |
| | 4 | " | 90 | 1 | " | 0 | aqueous ammonia solution |
| | 5 | Kayacyl Rubinol 3GS | 90 | 10 | 570 | 5 | |
| | 6 | " | 80 | 10 | " | 8 | ethylene glycol solution of amine |
| | 7 | " | 90 | 10 | " | 7 | |
| | 8 | " | 90 | 10 | " | 16 | |
| | 9 | Kayanol Blue NR | 80 | 10 | 610 | 9 | aqueous amine solution |
| | 10 | " | 80 | 5 | " | 12 | aqueous amine solution |

TABLE 1-continued

| | | | | | | |
|---|---|---|---|---|---|---|
| 11 | " | 90 | 5 | " | 0 | |
| 12 | " | 80 | 5 | " | 11 | ethylene glycol solution of amine |
| 13 | " | 60 | 120 | " | 4 | |
| 14 | " | 60 | 60 | " | 8 | |
| 15 | " | 60 | 60 | " | 3 | |
| 16 | " | 70 | 30 | 610 | 2 | |
| 17 | " | 70 | 30 | " | 0 | |
| 18 | " | 70 | 30 | " | 4 | |
| 19 | " | 70 | 30 | " | 4 | |
| 20 | " | 70 | 30 | " | 10 | |
| 21 | " | 70 | 30 | " | 8 | |
| 22 | " | 70 | 30 | " | 6 | aqueous piperazine solution |
| 23 | " | 70 | 30 | " | 12 | |
| 24 | " | 70 | 30 | " | 10 | |
| 25 | " | 70 | 30 | " | 7 | aqueous imidazole solution |
| Comparative example 1 | Kayalon Navy Blue NB-E | 92 | 30 | 590 | 4 | |
| 2 | Kayanol Blue NR | 80 | 30 | 610 | 91.5 | |
| 3 | " | 80 | 30 | " | 91 | |
| 4 | — | — | — | — | — | |

EXAMPLE 26

In 90 g of diethylene glycol bis(allyl carbonate) (trademark: CR-39, sold by PPG Industries, Inc.) was dissolved 10 g of a homopolymer (weight average molecular weight: 1,500) of glycidyl methacrylate and then 3 g of benzoyl peroxide was added to the solution, and the resulting mixture was homogeneously mixed. A polyvinyl chloride gasket having a diameter of 2 mm was interposed between a pair of previously cleaned glass plates (220mm length × 180 mm width × 6 mm thickness), and was fixed between them by means of a double clip to form a mold. The above obtained homogeneous mixture was poured into this mold and polymerized in an incubator according to a polymerization schedule, wherein the mixture was kept at 70° C. for 13 hours and then kept at 115° C. for 2 hours. Then, the cured product was taken out from the mold, and a test piece of 50 mm square was cut out from the cured product. This test piece was treated at 70° C. for 30 minutes in 100% monoethanolamine to obtain a surface-modified product.

Into water were added 0.05 g of Kayanol Blue NR (acid dye, sold by Nippon Kayaku Co., Ltd.), 0.1 g of sodium sulfate 10 hydrate and 0.15 g of glacial acetic acid, and the total amount of the resulting solution was made up to 100 ml. The solution was heated up to 90° C., and the above described surface-modified test piece was put into the heated solution and dyed therein for 5 minutes under stirring. After dyeing, the dyed test piece was taken out from the solution, washed with water and then dried. When the transmittance of the dyed test piece was measured within the wavelength range of 400–700 nm by means of a spectrophotometer, the following result was obtained.

| Wavelength (nm) | Transmittance (%) |
|---|---|
| 400 | 20 |
| 450 | 63 |
| 500 | 10 |
| 550 | 0 |
| 600 | 0 |
| 700 | 50 |

It was ascertained from the above obtained result that the cured product was satisfactorily dyed.

EXAMPLES 27–37 AND COMPARATIVE EXAMPLES 5–8

Polymerizations, amine treatments and dyeings were carried out in the same manners as described in Example 26. The raw materials, treating conditions and obtained results are shown in Table 2 together with those of Example 26.

In Comparative example 6, the amount of component (A) is small, and therefore although a copolymer having a smooth surface was obtained in the polymerization, the copolymer was erroded at its surface during the amine treatment, and was not able to be finished into a smooth surface.

The symbols indicating the components of copolymer in Table 2 are as follows.

CR-39: diethylene glycol bis(allyl carbonate) (sold by PPG Industries Inc., trademark)
GMA: glycidyl methacrylate
GA: glycidyl acrylate
MMA: methyl methacrylate
PGMA: polyglycidyl methacrylate
PGA: polyglycidyl acrylate
PMMA: polymethyl methacrylate
PC: polycarbonate (average polymerization degree $n \simeq 7$, trademark: Iupilon AL, sold by Mitsubishi Gas Chemical Co., Inc.)
St: styrene
AN: acrylonitrile
i-BOMA: isobutyl methacrylate

TABLE 2

| | | Component | | | | |
|---|---|---|---|---|---|---|
| | | A, (wt %) | B, (wt %) | | C, (wt %) | D, (wt %) |
| Example | 26 | CR-39, 90 | PGMA | (MW:1,500), 10 | | |
| | 27 | CR-39, 90 | PGA | (MW:10,000), 10 | | |
| | 28 | CR-39, 90 | PGMA | (MW:50,000), 10 | | |
| | 29 | CR-39, 80 | GMA/MMA = 1/1 | (MW:10,000), 20 | | |
| | 30 | CR-39, 90 | GA/MMA = 1/1 | (MW:10,000), 10 | | |
| | 31 | CR-39, 80 | GMA/i-BOMA = 1/1 | (MW:10,000), 20 | | |

TABLE 2-continued

|  |  |  |  |  |  |
|---|---|---|---|---|---|
|  | 32 CR-39, 90 | GMA/St/MMA = 3/3/4 | (MW:10,000), 10 |  |  |
|  | 33 CR-39, 95 | GMA/St/AN = 2/6/2 | (MW:10,000), 5 |  |  |
|  | 34 CR-39, 89 | PGMA | (MW:50,000), 10 |  | PC, 1 |
|  | 35 CR-39, 80 | PGMA | (MW:50,000), 10 | i-BOMA, 10 |  |
|  | 36 CR-39, 80 | PGMA | (MW:50,000), 10 |  | PMMA, 10 |
|  | 37 CR-39, 60 | GMA/MMA = 1/1 | (MW:10,000), 30 | MMA, 10 GMA, 10 |  |
| Comparative example | 5 CR-39, 90 |  |  |  |  |
|  | 6 CR-39, 30 | PGMA | (MW:50,000), 10 |  | PMMA, 60 |
|  | 7 CR-39, 100 |  |  |  |  |
|  | 8 CR-39, 80 |  |  |  | PMMA, 20 |

|  |  | Appearance of a cured product sheet taken out from the mold | Treating amine | Dye (Kayanol) | Transmittance (%) (at 600 nm) |
|---|---|---|---|---|---|
| Example | 26 | colorless and transparent, no crack | monoethanolamine | Blue-NR | 0 |
|  | 27 | colorless and transparent, no crack | diethanolamine | Blue-NR | 0 |
|  | 28 | colorless and transparent, no crack | cyclohexylamine | Blue-NR | 10 |
|  | 29 | colorless and transparent, no crack | piperidine | Blue-NR | 11 |
|  | 30 | colorless and transparent, no crack | monoethanolamine | Blue-NR | 3 |
|  | 31 | colorless and transparent, no crack | monoethanolamine | Blue-NR | 0 |
|  | 32 | colorless and transparent, no crack | monoethanolamine | Blue-NR | 12 |
|  | 33 | pale yellow and transparent, no crack | monoethanolamine | Blue-NR | 18 |
|  | 34 | slightly white-turbid, no crack | monoethanolamine | Blue-NR | 0 |
|  | 35 | colorless and transparent, no crack | monoethanolamine | Blue-NR | 0 |
|  | 36 | colorless and transparent, no crack | monoethanolamine | Blue-NR | 0 |
|  | 37 | colorless and transparent, no crack | monoethanolamine | Blue-NR | 0 |
| Comparative example | 5 | colorless and transparent, crack | monoethanolamine | Blue-NR | 0 |
|  | 6 | colorless and transparent, no crack | monoethanolamine | Blue-NR | 8 |
|  | 7 | colorless and transparent, crack | monoethanolamine | Blue-NR | 92 |
|  | 8 | colorless and transparent, no crack | monoethanolamine | Blue-NR | 91 |

EXAMPLE 38

A copolymer was produced from diethylene glycol bis(allyl carbonate) (trademark: CR-39) and glycidyl methacrylate (abbreviated as GMA) in a mixing ratio of CR-39/GMA of 90/10, and a test piece of 30 mm length×20 mm width×1.5 mm thickness was produced from the copolymer and treated with monoethanolamine in the same manners as describe in Example 11. The amine-treated test piece was dyed with acid dyes shown in Table 3 in the following manner. The amine-treated test piece was put into a test tube of 24×mm diameter×200 mm length, and 20 g of each of the dye solutions I-IV, which had the following compositions, was added to the test tube. Then, the test tube was immersed for 30 minutes in a bath kept at about 92° C. to obtain a dyed resin sheet.

| Composition of dye solutions |  |
|---|---|
| Dye solution I |  |
| Dye | 0.1% |
| Glauber's salt | 2% |
| Formic acid | 5% |
| Water | balance |
| Dye solution II |  |
| Dye | 0.1% |
| Glauber's salt | 2% |
| Formic acid | 3% |
| Water | balance |
| Dye solution III |  |
| Dye | 0.1% |
| Glauber's salt | 2% |
| Glacial acetic acid | 3% |
| Water | balance |
| Dye solution IV |  |
| Dye | 0.1% |
| Ammonium acetate | 5% |
| Glacial acetic acid | 2% |
| Water | balance |

The transmittance of each of the dyed test pieces was measured within the wavelength range of 400-700 nm by means of a spectrophotometer. The obtained results are shown in Table 3. In Table 3, the dyeability of the dye is evaluated according to the following transmittance at the specific wavelength inherent to the dye, at which the largest amount of light is absorbed.

| Transmittance | Dyeability |
|---|---|
| lower than 5% | ⊚ very excellent |
| 5–10% | ⊙ excellent |
| 10–30% | △ good |
| higher than 30% | x poor |

TABLE 3

| Sample No. | Dye (Trademark) | | CI No. (Acid) | Dye solution used | Dyeability |
|---|---|---|---|---|---|
| | *Kayacyl Colors* | | | | |
| 1 | Brilliant Flavine FF | Y | 7:1 | I | ⊚ |
| 2 | Yellow GG | Y | 17 | I | ⊚ |
| 3 | Rubinol 3GS | R | 37 | I | ⊚ |
| 4 | Rhodamine FB | R | 52 | I | ⊚ |
| 5 | Sky Blue R | B | 62 | II | ⊚ |
| 6 | Blue HRL | B | 182 | I | ⊚ |
| 7 | Pure Blue FGA | B | 7 | I | ⊚ |
| | *Kayaku Polyamide Colors* | | | | |
| 8 | Black 2JN | | | III | ○ |
| | *Kayanol Colors* | | | | |
| 9 | Yellow NFG | Y | 49 | II | ⊚ |
| 10 | Yellow N5G | Y | 110 | III | ⊚ |
| 11 | Yellow N3R | O | 67 | IV | ⊚ |
| 12 | Red NBR | R | 366 | III | ⊚ |
| 13 | Red NB | R | 266 | III | ⊚ |
| 14 | Floxine NK | R | 257 | II | ⊚ |
| 15 | Red 3BL | R | 254 | III | ⊚ |
| 16 | Blue NR | B | 129 | III | ⊙ |
| 17 | Cyanine GB | B | 83 | III | ⊚ |
| 18 | Cyanine G | B | 90 | III | ⊚ |
| 19 | Blue N2G | B | 40 | II | ⊚ |
| 20 | Cyanine Green G | G | 25 | III | ⊚ |
| 21 | Navy Blue R | B | 92 | III | ⊚ |
| | *Kayanol Milling Colors* | | | | |
| 22 | Yellow 5GW | Y | 127 | IV | ⊚ |

TABLE 3-continued

| Sample No. | Dye (Trademark) | CI No. | (Acid) | Dye solution used | Dyeability |
|---|---|---|---|---|---|
| 23 | Yellow 3GW | Y | 72 | IV | ◉ |
| 24 | Yellow O | O | 38 | IV | ◉ |
| 25 | Yellow RW new | O | 149 | IV | ◉ |
| 26 | Orange G | O | 56 | IV | ◉ |
| 27 | Brown 4GW | Br | 13 | IV | ◉ |
| 28 | Brown RX | O | 51 | IV | ◉ |
| 29 | Red Brown V | R | 119 | IV | ◉ |
| 30 | Scarlet FGW | R | 138 | IV | ◉ |
| 31 | Red GRA | | — | IV | ◉ |
| 32 | Red RS 125 | R | 114 | IV | ◉ |
| 33 | Red BW | R | 138 | IV | ◉ |
| 34 | Red 3BW | R | 274 | IV | ◉ |
| 35 | Red 6BW | V | 97 | IV | ◉ |
| 36 | Violet FBW | V | 48 | IV | ◉ |
| 37 | Blue 2RL | B | 140 | IV | ◉ |
| 38 | Ultra Sky SE | B | 112 | IV | ◉ |
| 39 | Blue BW | B | 138 | IV | ◉ |
| 40 | Blue GW | B | 127 | III | O |
| 41 | Turquoise Blue 3G | B | 185 | IV | X |
| 42 | Green 5GW | G | 28 | IV | ◉ |
| 43 | Green GW | G | 27 | IV | ◉ |
| 44 | Cyanine 5R | B | 113 | IV | ◉ |
| 45 | Black TLR | Bk | 110 | IV | ◉ |
| 46 | Black TLB | Bk | 109 | IV | ◉ |
| 47 | Black VLG | Bk | 26 | IV | ◉ |
| Kayakalan Colors | | | | | |
| 48 | Yellow GL 143 | Y | 161 | IV | ◉ |
| 49 | Orange RL | O | 122 | IV | ◉ |
| 50 | Brown GL | Br | 294 | IV | ◉ |
| 51 | Brown RL 143 | Br | 297 | IV | ◉ |
| 52 | Scarlet GL | R | 317 | IV | ◉ |
| 53 | Red BL | R | 318 | IV | ◉ |
| 54 | Bordeaux BL | R | 256 | IV | O |
| 55 | Olive GL | G | 75 | IV | ◉ |
| 56 | Grey BL | Bk | 122 | IV | ◉ |
| 57 | Blue Black RL | Bk | 234 | IV | ◉ |
| 58 | Black 2RL | Bk | 155 | IV | ◉ |
| 59 | Black BGL | Bk | 107 | IV | ◉ |
| Kayalax Colors | | | | | |
| 60 | Yellow G | Y | 207 | IV | ◉ |
| 61 | Brown GR | Br | 282 | IV | ◉ |
| 62 | Brown R | Br | 283 | IV | ◉ |
| 63 | Red G | R | 315 | IV | ◉ |
| 64 | Olive G | G | 73 | IV | ◉ |
| 65 | Navy R | B | 300 | IV | ◉ |
| 66 | Navy B | B | 229 | IV | ◉ |
| SANDOZ | | | | | |
| 67 | Yellow E-3GL 150% | Y | 196 | IV | ◉ |
| 68 | Brilliant Red E-BL | R | 106 | IV | ◉ |
| 69 | Brilliant Green E-B 400% | G | 16 | IV | ◉ |
| 70 | Blue 2AL 200% | B | 25 | IV | ◉ |
| Kayaku | | | | | |
| 71 | Red 14P | | | IV | ◉ |
| BAYER A.G. | | | | | |
| 72 | TELON Fast Red AF3G 150% | | | IV | ◉ |
| 73 | TELON Fast Red ER | | | IV | ◉ |
| 74 | TELON Red FRLL | | | IV | ◉ |
| 75 | TELON Fast Blue ESN | | | IV | ◉ |
| 76 | ALIZARIN Brilliant Blue GLW | | | IV | ◉ |
| Showa Kako | | | | | |
| 77 | Yellow MR Concentration | Y | 42 | IV | ◉ |
| 78 | Red RS Concentration | R | 114 | IV | ◉ |
| 79 | Blue 5C Concentration | B | 103 | IV | ◉ |

What is claimed is:

1. A method for modifying the surface of a polycarbonate resin substrate, comprising the steps of:

providing a polycarbonate resin substrate, said polycarbonate resin comprising a copolymer of 50-99 wt % diethylene glycol bis(allyl carbonate), and 1-50 wt % of one member of monomers of glycidyl acrylate or glycidyl methacrylate, homopolymers thereof and copolymers thereof with a monomer copolymerizable therewith;

providing an amine, or solution thereof, having an active hydrogen atom, said amine, or solution thereof, being maintained at a temperature of about 50°-100° C.; and immersing said polycarbonate resin substrate in said amine, or solution thereof, for about 1-180 minutes to react the glycidyl group present in the surface of the polycarbonate resin substrate with the amine.

2. A method according to claim 1, wherein said polycarbonate resin substrate is polymerized at a temperature within the range of about 20°-130° C. for about 2-24 hours.

3. A method according to claim 1, wherein said amine is one of the amines represented by the following general formula (I) and (II):

wherein $R_1$ and $R_2$ may be the same or different and represent hydrogen atoms, linear or branched alkyl groups having 1-8 carbon atoms, alkanol groups having 1-8 carbon atoms, residues of alicyclic or aromatic compounds having 3-8 carbon atoms, or residues of compounds having 2-10 atoms in the total number of carbon and nitrogen atoms; and

wherein $R_3$ represents a residue of a compound having 2-10 atoms in the total number of carbon and nitrogen atoms.

4. A method according to claim 1, wherein the homopolymer or copolymer of glycidyl acrylate or glycidyl methacrylate contains 2-100% by weight of glycidyl acrylate monomer units or glycidyl methacrylate monomer units.

* * * * *